United States Patent [19]
Norvell

[11] Patent Number: 4,746,260
[45] Date of Patent: May 24, 1988

[54] TRANSPORT AND LIFTING APPARATUS FOR RAILWAY CARS

[76] Inventor: Don Norvell, P.O. Box 62, Pasco, Wash. 99301

[21] Appl. No.: 22,737

[22] Filed: Mar. 6, 1987

[51] Int. Cl.$^4$ .............................. B60P 1/64; B60P 3/40
[52] U.S. Cl. ...................................... 414/460; 414/785
[58] Field of Search ............... 414/458, 459, 460, 785; 254/2 B, 8 B

[56] References Cited

U.S. PATENT DOCUMENTS

| | | |
|---|---|---|
| 2,043,507 | 6/1936 | Culemeyer . |
| 2,058,955 | 10/1936 | Culemeyer . |
| 2,463,381 | 3/1949 | Hicks ............................... 414/458 X |
| 2,867,409 | 1/1959 | Southerwick ........................ 254/2 B |
| 3,145,863 | 8/1964 | Dunaski .............................. 414/458 |
| 3,520,430 | 7/1970 | Dunbar ............................... 414/458 |
| 3,612,484 | 10/1971 | Gallagher et al. .............. 414/458 X |
| 3,645,559 | 2/1972 | Stafford, Jr. ...................... 414/458 X |
| 3,850,321 | 11/1974 | Virnig ................................. 414/427 |
| 4,015,736 | 4/1977 | Erickson ............................ 414/458 |
| 4,087,013 | 5/1978 | Wiley, Jr. ............................ 414/459 |

FOREIGN PATENT DOCUMENTS 229835 11/1985 Japan ................................... 414/460

Primary Examiner—Robert J. Spar
Assistant Examiner—Stuart J. Millman
Attorney, Agent, or Firm—Wells, St. John & Roberts

[57] ABSTRACT

A trailer for lifting and transporting a railway car minus its usual wheeled trucks utilizes a pair of independently positioned wheeled frames in the form of front and rear units that can be located at opposite ends of the railway car. Each wheeled frame supports a forklift assembly having transversely spaced protruding arms capable of fitting under the floor of the railway car while straddling the central longitudinal beam extending from its one end to the other. The forklift assemblies are selectively secured to the railway car to form an integral trailer capable of transporting it on a highway within normal height limitations. The front and rear units can be used to maneuver the railway car into place above a foundation, and can raise or lower the railway car as necessary to remove or place it as desired.

5 Claims, 4 Drawing Sheets

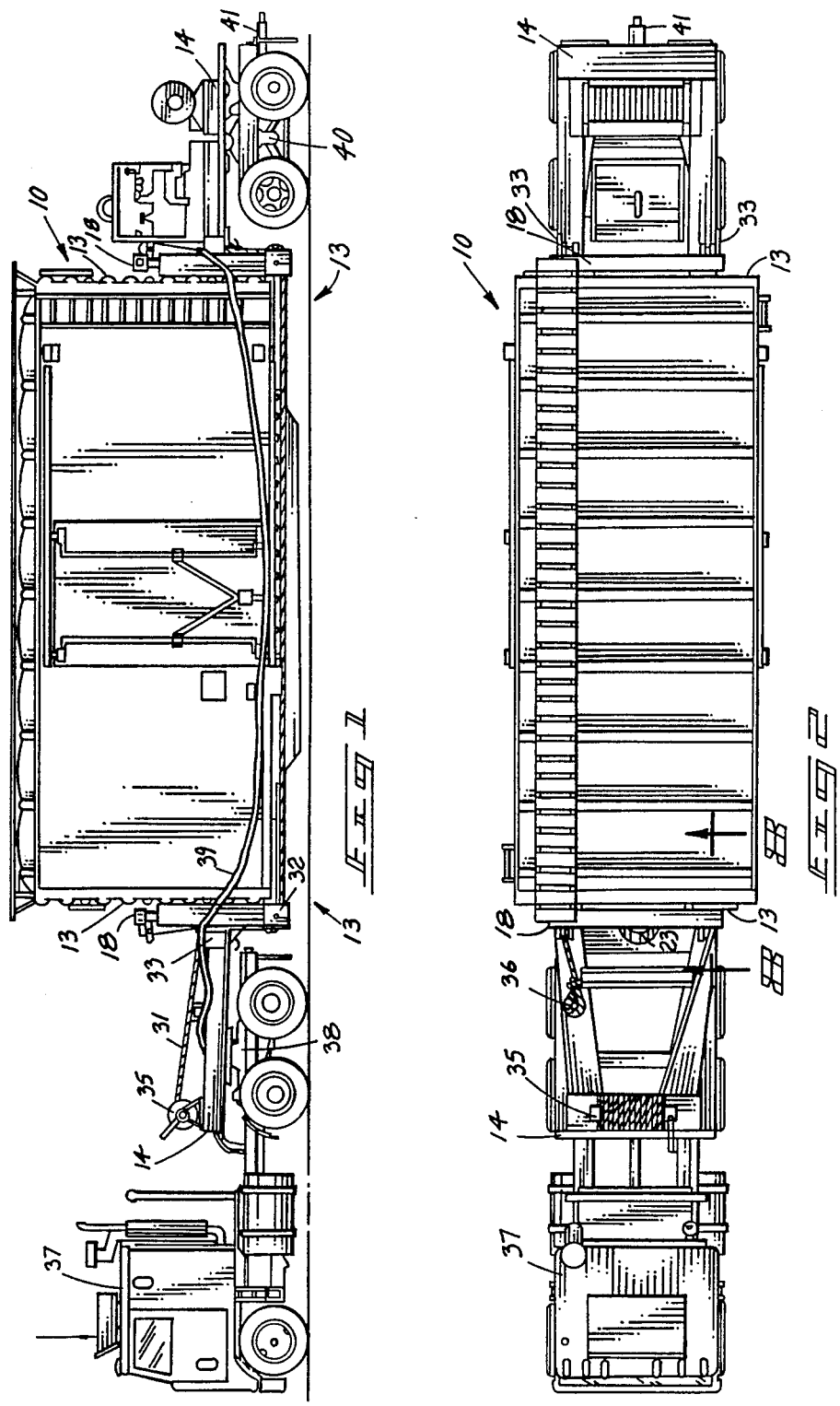

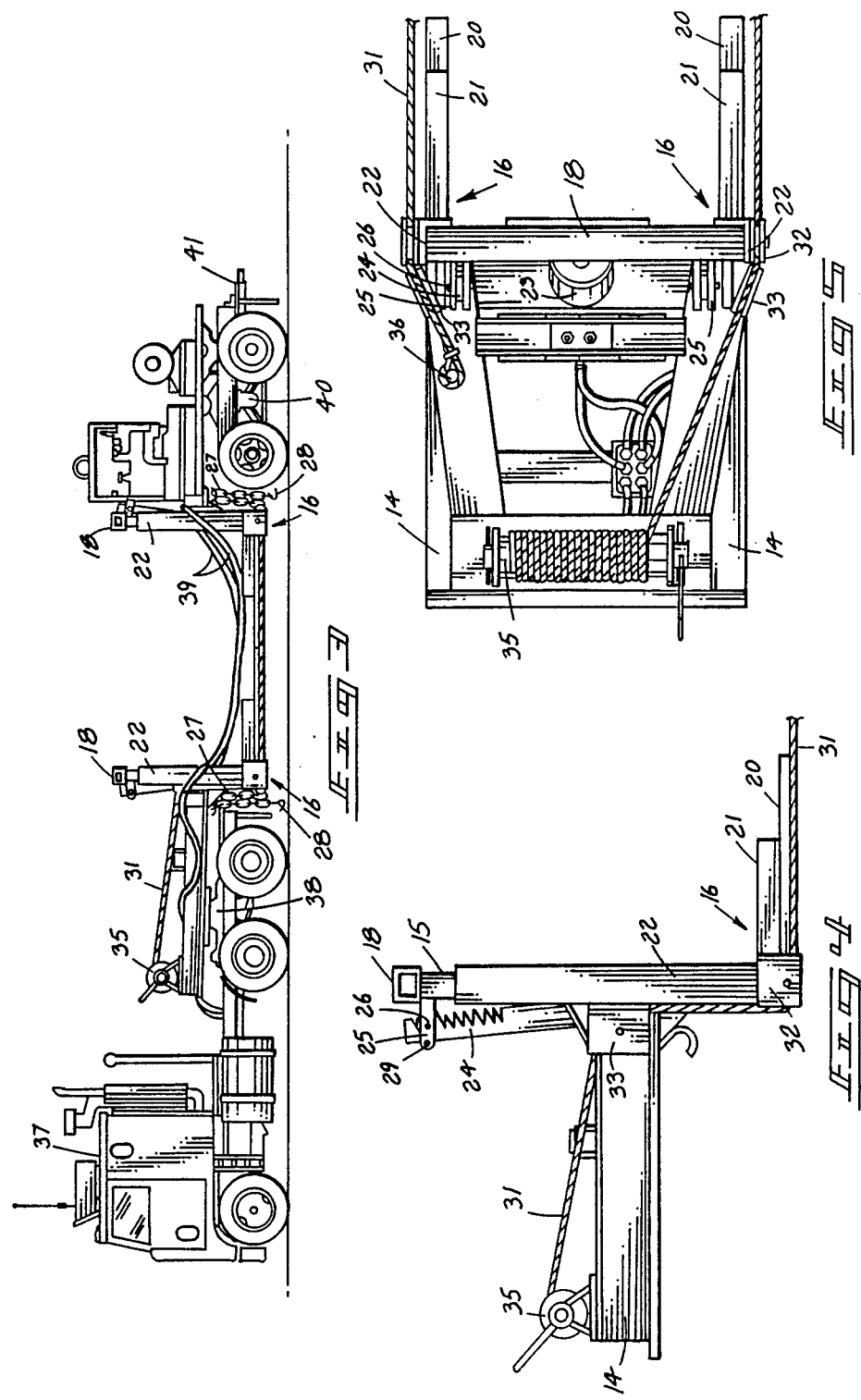

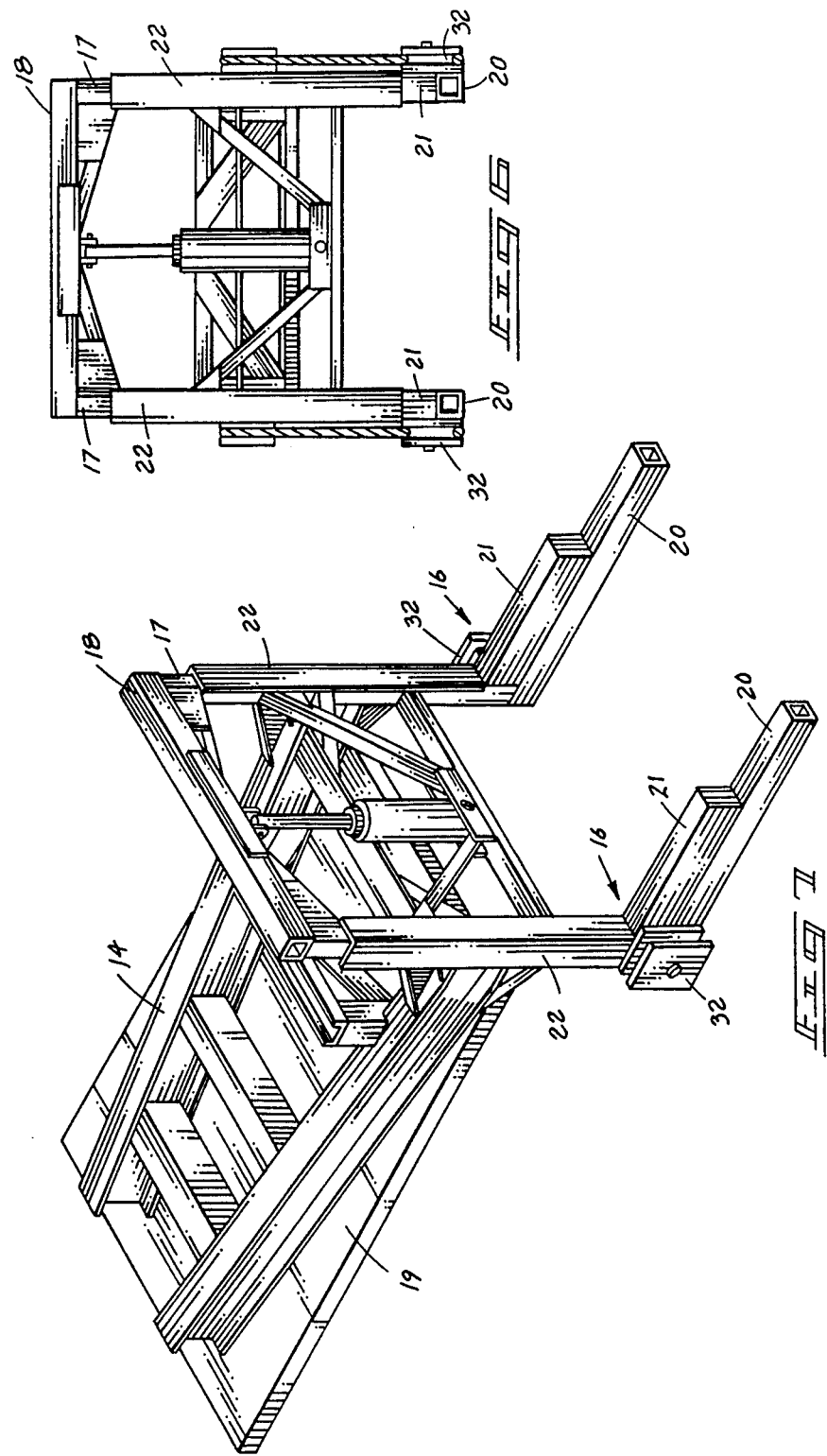

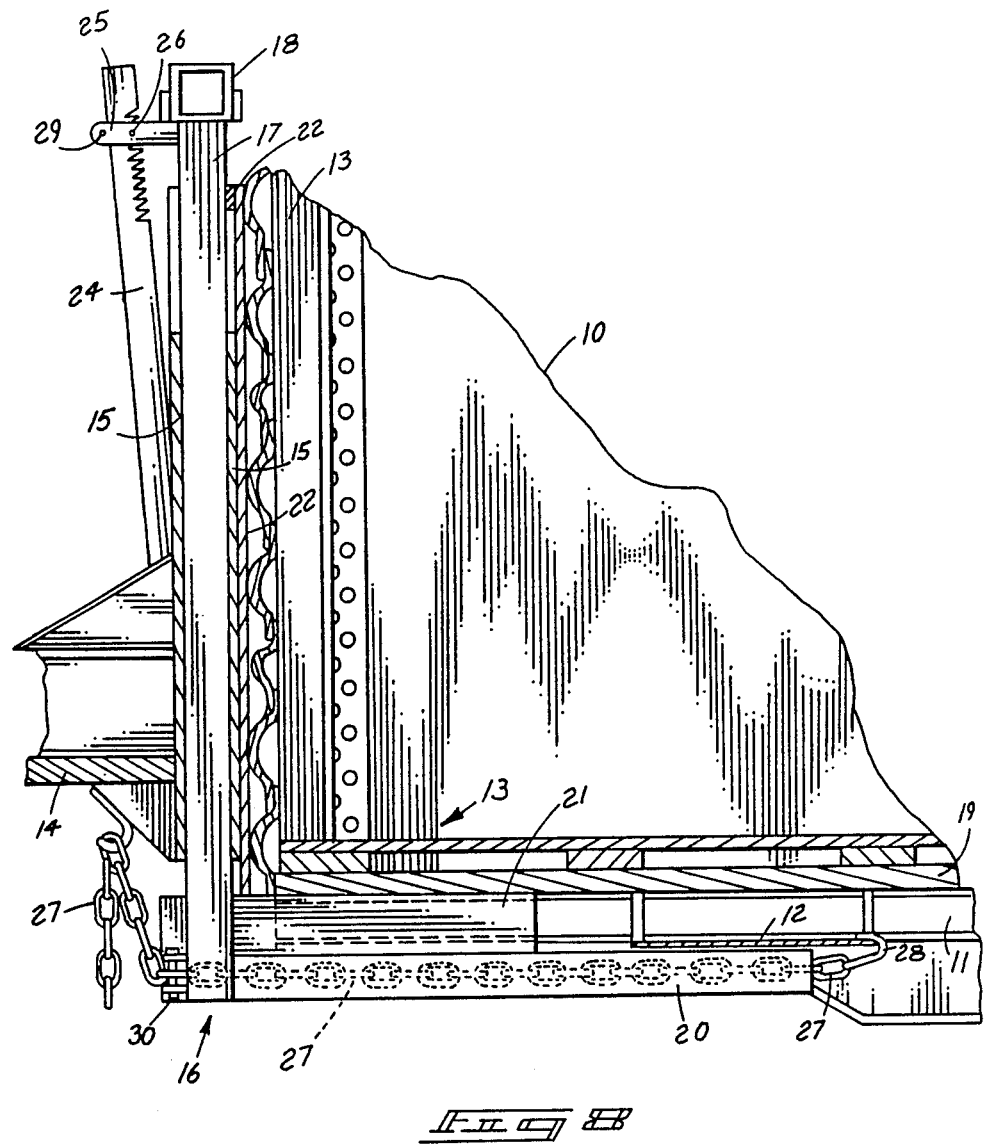

TRANSPORT AND LIFTING APPARATUS FOR RAILWAY CARS

TECHNICAL FIELD

This invention relates to a specialized trailer designed to facilitate the transport and lifting of railway cars after removal of their supporting wheel trucks.

BACKGROUND OF THE INVENTION

The present invention is designed for moving used railway cars, such as box cars and refrigerator cars, from one site to another. Surplus railway cars are recyclable for use as storage sheds or utility buildings. They are particularly desirable for rural and manufacturing storage. Refrigerated cars, being insulated and provided with a self-contained refrigeration system, are utilized by farmers as refrigerated storage buildings for produce, meat, dairy products and other applications where refrigeration is desirable.

The conventional manner by which railway cars are moved from one site to another involves use of a crane or a tractor forklift and a supporting flatbed trailer. However, the use of such equipment requires at least two operators and generally involves substantial expense for rental of machinery. More importantly, the transporting of moving box cars while supported on a typical flatbed trailer requires special height permits for highway travel. Height restrictions on highways can make such transport efforts prohibitively expensive.

Railway box cars are relatively uniform in height. In the United States, most box cars, after removal of their supporting wheel trucks, have a height of thirteen feet, six inches, from ground to roof surface. Since the normal height limits for loads carried on interstate highways in the United States is fourteen feet, the unsupported box car has only six inches of clearance available, much too little for effective use of an underlying flatbed trailer.

The specialized trailer described herein has been designed to lift a box car at its opposite ends, transport the box car while supported with an acceptable ground clearance and maximum height suitable for highway transport purposes, and subsequently position and lower the box car onto an awaiting foundation for stationary storage purposes. It is adaptable to railway cars of any length; since it utilizes two opposed support structures interconnected only by the structure of the railway car itself. The machinery for transporting, unloading and loading a railway car can be readily operated and moved by a single person.

BRIEF DESCRIPTION OF THE DRAWINGS

The preferred embodiment of the invention is illustrated in the accompanying drawings, in which:

FIG. 1 is a side assembly view showing a loaded trailer;

FIG. 2 is a top view;

FIG. 3 is a side assembly view showing an unloaded trailer;

FIG. 4 is a side view of the front trailer unit;

FIG. 5 is a top view;

FIG. 6 is a rear view;

FIG. 7 is a perspective view of the partially assembled frame and forklift elements; and FIG. 8 is a fragmentary longitudinal sectional view taken alongside a loaded forklift arm.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

The superstructure of a typical railway car 10 is shown in FIGS. 1, 2 and 8. When decommissioned after normal railway use, the wheel trucks (not shown) that support the railway car on a track are removed from beneath front and back transverse frames 12 that extend under its floor 19. Floor 19 is also structurally supported by a central longitudinal beam 11 that extends between the opposed transverse outer ends 13 of the railway car. The transverse frames 12 are located longitudinally inward adjacent to the outer ends 13 of the railway car 10.

The present trailer includes front and rear units illustrated at the left and right hand ends, respectively, of FIGS. 1 through 3. The principal elements of both units are identical to one another, and will be described by use of identical reference numerals applied to corresponding elements of each unit. The structural and operational differences that exist between the two units will be detailed below.

Each unit includes a rigid wheel-supported frame 14, shown as being fabricated from conventional metal beams. The front unit carries the frame 14 and an underlying floor member 19 on a conventional fifth-wheel assembly 38 attached to a highway tractor 37. The rear unit includes a dual-axle bogey 40 preferably connected to frame 14 for relative movement with respect to a transverse axis and a central vertical axis. The connection about the vertical axis permits the rear bogey 40 to be independently steered through a connection to an extendible hitch 41 that can be attached to a tractor or other vehicle (not shown) to assist in placing the railway car precisely over a receiving foundation (not shown).

One end of each frame 14 is provided with perpendicular hollow tubular guides 15 that slidably support a vertically movable forklift assembly 16. Each forklift assembly includes a pair of transversely spaced vertical posts 17. Their upper ends are rigidly connected by a horizontal cross-member 18. Outwardly protruding arms 20 extend from their respective lower ends. Covering abutments 22 overlap and are fixed to the posts 17. The outer surfaces of abutments 22 provide upright members adapted to abut an outer end of a railway car. The arms 20 serve as perpendicular protruding members adapted to be engaged beneath the outer end 13 of the railway car 10 for carrying the weight of the railway car at the abutted end for lifting purposes. Actual lifting forces on the railway car 10 are exerted through a solid pad 21 fixed along a portion of the upper surface of each arm 20.

The forklift assemblies 16 are elevationally adjustable relative to the wheel-supported frames 14 by power means operably connected between them. This power means is shown in the form of an upright hydraulic cylinder 23 anchored at its lower end to frame 14 and having an extensible piston rod connected to the center of cross member 18.

The trailer assembly shown in FIGS. 1 and 2 is completed by releasable securing means on the frames 14 that prevent longitudinal movement of the railway car 10 relative to the lifting forklift assemblies 16. In the present form of the invention, the preferred securing means is a length of chain 27 having a hook 28 at one end. The operational section of chain 27 is extended through the hollow arm 20 that supports it. This permits hook 28 to be engaged about a transverse edge of frame 12 under the railway car 10. Chain 27 can then be pulled manually toward the frame 14, where its remaining end is selectively attached to the inner end of its supporting arm 20 by a releasable locking pin assembly shown at 30 (FIG. 8).

As a safety feature, the front and rear units of the trailer are also secured to one another by tension applied to a continuous length of cable 31. One end of the cable 31 is anchored to the frame 14 of the front unit, as shown at 36 (FIGS. 2, 5). The opposite end of cable 31 is wound about a powered winch 35 on the front unit. The intermediate portions of cable 31 are guided by sheaves 32 at the inner end of each forklift arm 20, as well as by transfer sheaves 33 on the frames 14. Tension applied to cable 31 is used to pull the two wheeled units toward one another and into secure abutment with the intervening railway car 10.

It is to be understood that other arrangements can be readily utilized to secure the forklift assemblies 16 to the railway car 10 supported upon them. As examples, the forklift arms 20 might be pinned or bolted to the transverse frames 12 beneath the railway car 10, or to other structural elements adjacent to them. The hollow nature of arms 20 also facilitates the use of extendible hooks located within them (not shown), which might be operated by suitable mechanical or hydraulic mechanisms.

In addition to the hydraulic cylinders 23, the elevated forklift assemblies 16 are preferably supported by a mechanical interlock to prevent the supported weight of the railway car 10 from dropping in the event of failure of the hydraulic system. This interlock is shown as individual ratchet arms 24 pivotally supported on each frame 14 immediately behind the vertical post 17 of the forklift assembly 16. The ratchet arms 24 can be slidably received between spaced brackets 25 fixed at the upper end of each post 17. The brackets 25 include an outer guide pin 29 and an inner releasable pin 26. Pin 26 can be selectively placed between the inclined teeth formed along one edge of each ratchet arm 24, thereby providing vertical support between the forklift assembly 16 and frame 14. When not needed, the ratchet arms 24 can be released from within brackets 25 by elevating the forklift assembly 16, which permits the upper ends of ratchet arms 24 to swing clear of the brackets 25.

The described trailer can be readily configured between an unloaded transport position (FIG. 3) and a fully loaded configuration (FIGS. 1 and 2), where the independent front and rear units are interconnected by the interposed railway car 10. It requires no use of wheels or other ground supports under the superstructure of the railway car 10, thereby minimizing the overall height of the assembly for highway height limitation purposes. The railway car 10 is effectively lifted at its opposed outer transverse ends, by engaging downwardly facing horizontal support surfaces recessed upwardly within the longitudinal and transverse frame elements that support the floor 19.

When connected for transport purposes in an unloaded condition, the abutting front and rear units of the trailer can be connected to one another by tightening the cable 31 that is entrained about the sheaves 32 and 33 on the respective forklift assembly 16 and supporting frames 14. An interior connecting member can be inserted within the hollow ends of arms 20 to maintain them in alignment, if desired. The forklift assemblies 16 can be transported at a desired elevation above the ground surface by operation of the hydraulic cylinders 23, which are preferably operated in unison with one another through a common valve and hydraulic pressure system, which can be located on frame 14 of the rear unit. Suitable interconnecting hydraulic hoses 39 can be extended between the two units as required by the hydraulic systems contained on them.

To attach the trailer to a railway car 10, the operator of the trailer must locate the forklift assemblies 16 against its opposed outer ends 13. The front unit can be readily positioned by operation of the tractor 37. The rear unit can similarly be positioned by attachment of hitch 41 to a tractor or vehicle that can roughly push it into place.

The transversely spaced forklift arms 20 are positioned on frames 14 to straddle the central longitudinal beam 11 provided along the underside of a railway car 10. After arms 20 are located beneath the floor 19, with the abutments 22 in engagement with the opposed outer ends 13 of the railway car 10, the assembly can be tightened by operation of winch 35 and the interconnecting cable 31 strung between the two units. The tension applied to cable 31 will pull the wheel-supported frames 14 snugly against the opposed ends 13 of the railway car 10.

Once the forklift assemblies 16 are fitted beneath the floor 19 of the railway car 10, the hydraulic cylinders 23 can be actuated to raise and lower it as required for movement relate to underlying foundations and for roadway transport purposes. The railway car 10 can be elevated with minimum clearance from the roadway to permit its transport within highway height limitations.

The front and rear units can be used to move the railway car 10 into proper position above a new foundation. They are operated in unison to raise or lower it as required. After placement of the railway car, the two units can be disengaged and moved independently apart by means of the tractor 37 and the releasable towing connection provided at hitch 41.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. An apparatus for facilitating the lifting and the transporting of a railway car following removal of its supporting wheel trucks from beneath a pair of transverse frames that are located inwardly adjacent to the outer ends of the railway car and are attached to a central longitudinal beam extending beneath the railway car, comprising:

first and second independently movable wheel-supported frames;

an elevationally adjustable forklift assembly movably mounted on each wheel-supported frame, each forklift assembly having an upright member adapted to abut one outer end of a railway car located between them, and also having a perpendicular protruding lower member adapted to be engaged beneath the outer end of a railway car for lifting purposes;

power means operably mounted between each wheel-supported frame and its forklift assembly for selectively imparting elevational movement to the forklift assembly relative to the frame;

releasable securing means on the wheel-supported frames engageable with a railway car for preventing longitudinal movement of it relative to the abutting forklift assemblies;

the perpendicular protruding member comprising a pair of longitudinally hollow horizontal arms spaced transversely from one another by a distance sufficient to straddle the central longitudinal beam beneath a railway car while engaged beneath one of its outer ends; and the securing means including an extendible member entrained through at least one arm and having one end adapted to be selectively secured to a transverse frame member of the railway car adjacent the outer end engaged by it, the remaining end of the extendible member being secured to one of the arms to maintain an operative section of the extendible member between the transverse frame member and the forklift assembly in tension.

2. The apparatus of claim 1, wherein the extendible member comprises a separate operative section of chain entrained through each longitudinally hollow arm, each operative section having a hook at its one end for attachment to the transverse frame member.

3. The apparatus of claim 1 wherein
each arm has a pad fixed to an upwardly facing surface thereof adjacent to the upright member of the forklift assembly, the pads being adapted to support the weight of a railway car engaged thereby.

4. The apparatus of claim 1, further comprising:
interlock means operably connected between each wheel-supported frame and the forklift assembly mounted on it for mechanically limiting downward movement of the forklift assembly relative to the wheel-supported frame independently of the power means mounted between them.

5. The apparatus of claim 1, wherein the securing means further includes a flexible member interconnecting the forklift assemblies of the two wheel-supported frames; and
power means operably connected to the flexible member for selectively drawing the forklift assemblies toward one another while abutting opposite ends of a railway car.

* * * * *